No. 885,510. PATENTED APR. 21, 1908.
T. G. McNEES & J. A. LACKEY.
NUT LOCK.
APPLICATION FILED MAR. 2, 1908.
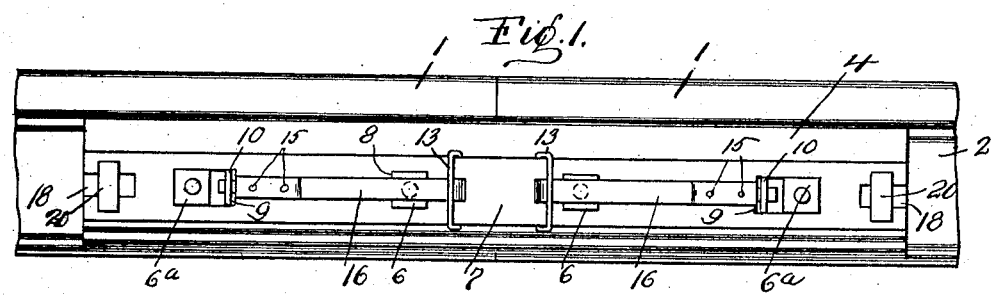
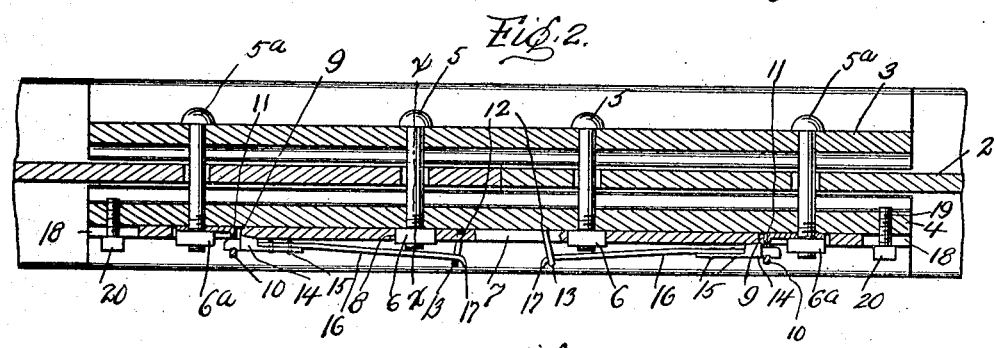
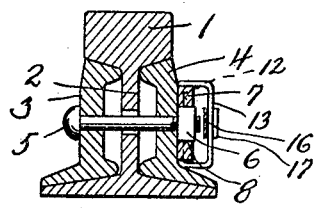
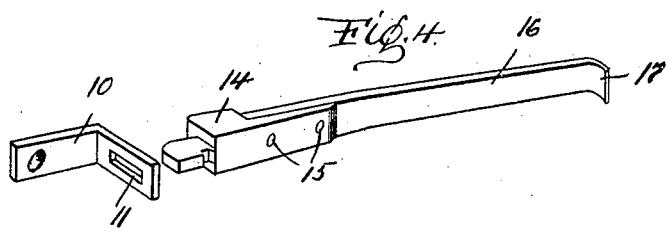
Inventors.
T. G. McNees and
J. A. Lackey.
Witnesses
Samuel Payne
O. H. Butler
By H. C. Everts
Attorneys

UNITED STATES PATENT OFFICE.

THOMAS G. McNEES AND JOHN A. LACKEY, OF SLIPPERY ROCK, PENNSYLVANIA.

NUT-LOCK.

No. 885,510.  Specification of Letters Patent.  Patented April 21, 1908.

Application filed March 2, 1908. Serial No. 418,749.

*To all whom it may concern:*

Be it known that we, THOMAS G. MCNEES and JOHN A. LACKEY, citizens of the United States of America, residing at Slippery Rock, in the county of Butler and State of Pennsylvania, have invented certain new and useful Improvements in Nut-Locks, of which the following is a specification, reference being had therein to the accompanying drawing.

This invention relates to a nut lock and fastener, and the objects of our invention are, first, to provide a simple and inexpensive nut lock; second, to provide a novel fastener for holding the nut lock in engagement with nuts; third, to provide a nut lock particularly adapted for rail joints; and fourth, to provide a nut lock and fastener that can be easily and quickly placed in position to prevent the displacement of nuts upon bolts.

We attain the above objects by a structure that will be presently described and then specifically pointed out in the appended claims.

Referring to the drawings: Figure 1 is an elevation of our nut lock and fastener, Fig. 2 is a horizontal sectional view of the same, Fig. 3 is a cross sectional view taken on the line $x$—$x$ of Fig. 2, and Fig. 4 is a perspective view of a portion of a nut lock and fastener.

In the accompanying drawings, 1 designates rails having their web portions 2 embraced by splice bars 3 and 4, said splice bars being secured to the rails by bolts 5 and $5^a$ and nuts 6 and $6^a$, the bolts extending through the web portions 2 of said rails and said splice bars. Fitting upon the nuts 6 and $6^a$ is an oblong plate 7 having square openings 8 formed therein for the nuts 6, and oblong openings 9 for the nuts $6^a$. Mounted upon the bolts $5^a$ between the nuts $6^a$ and the splice bar 4 are washers 10 having right angular slotted extensions 11. The plate 7 intermediate its ends has its rear or inner face provided with vertically disposed grooves 12 for oblong links 13, these links surrounding the plate 7.

Adapted to engage in the slotted extensions 11 of the washers 10 and the links 13 are resilient fasteners, each fastener comprising a toothed head 14, to which is secured, as at 15, a resilient arm 16 having a bent end 17. The toothed head 14 is adapted to engage in the slotted extension 11 of the washer 10, while the bent end 17 of the resilient arm 10 is adapted to engage in the link 13. In addition to using the fasteners and washers for holding the plate 7 in position, we can slot the ends of the plate 7, as at 18, and use screw bolts or pins 19 having T-shaped heads 20, these screw bolts being mounted in the splice bar 4.

It will be observed from the drawing that the nuts 6 fill the openings 8, while the upper and lower edges of the oblong openings 9 prevent the nuts $6^a$ from rotating.

The fasteners held in engagement with the washers 10 by the links 13 are adapted to prevent the plate 7 from being dislodged from the nuts 6 and $6^a$.

We reserve the right to make such changes in our invention as are permissible by the appended claims.

Having now described our invention what we claim as new, is:—

1. In a nut lock and fastener, the combination with bolts, and nuts mounted thereon, of a plate mounted upon said nuts and having openings to receive said nuts and prevent their rotation, washers mounted on some of said bolts and having slotted extensions, links supported by said plate, fasteners engaging said slotted extensions and said links, said fasteners comprising toothed heads and resilient arms, substantially as described.

2. In a nut lock and fastener; the combination with bolts, and nuts mounted thereon, of a plate mounted upon said nuts and having openings to receive said nuts and prevent their rotation, washers mounted on some of said bolts and having slotted extensions, links supported by said plate, and fasteners engaging said slotted extensions and said links for holding said plate upon said nut.

In testimony whereof we affix our signatures in the presence of two witnesses.

THOMAS G. McNEES.
JOHN A. LACKEY.

Witnesses:
 FRANK LACKEY,
 MAX H. SROLOVITZ.